(12) United States Patent  
Elliott et al.

(10) Patent No.: US 10,330,499 B2  
(45) Date of Patent: Jun. 25, 2019

(54) MICRO INDUCTIVE SENSOR

(71) Applicant: KSR IP Holdings, LLC, Wilmington, DE (US)

(72) Inventors: Ryan W. Elliott, Chatham (CA); Lingmin Shao, Ridgetown (CA)

(73) Assignee: KSR IP Holdings, LLC, Wilmington, DE (US)

( * ) Notice: Subject to any disclaimer, the term of this patent is extended or adjusted under 35 U.S.C. 154(b) by 1098 days.

(21) Appl. No.: 14/269,871

(22) Filed: May 5, 2014

(65) Prior Publication Data

US 2014/0327432 A1    Nov. 6, 2014

Related U.S. Application Data

(60) Provisional application No. 61/819,118, filed on May 3, 2013.

(51) Int. Cl.  
*G01D 5/20* (2006.01)

(52) U.S. Cl.  
CPC .................. *G01D 5/2066* (2013.01)

(58) Field of Classification Search  
CPC .... G01D 5/204; G01D 5/2046; G01D 5/2066; G01D 5/2073; G01D 5/208; G01D 5/2086; G01D 5/2093  
See application file for complete search history.

(56) References Cited

U.S. PATENT DOCUMENTS

| | | | |
|---|---|---|---|
| 6,384,598 B1 | 5/2002 | Hobein et al. | |
| 7,999,534 B2 | 8/2011 | Hori et al. | |
| 8,453,518 B2 | 6/2013 | Diekmann et al. | |
| 9,558,878 B1 * | 1/2017 | Abu-Qahouq | H01F 27/24 |

(Continued)

FOREIGN PATENT DOCUMENTS

| | | |
|---|---|---|
| CN | 1873367 A | 12/2006 |
| CN | 102822634 A | 12/2012 |

(Continued)

OTHER PUBLICATIONS

International Search Report dated Aug. 26, 2014, International Application No. PCT/US2014/036826.

(Continued)

*Primary Examiner* — Huy Q Phan  
*Assistant Examiner* — Adam S Clarke  
(74) *Attorney, Agent, or Firm* — Dinsmore & Shohl LLP

(57) ABSTRACT

An inductive sensor includes a sensor package and a coupler package. The sensor package includes a signal processor, an integrated capacitor, a ferrite layer, a transmitter coil, a two part receiving coil, and a plurality of discrete components. The coupler package includes an integrated capacitor, a ferrite layer, and a coupler coil. The transmitter coil in the sensor package is energized by an external power source which in turn energizes the coupler coil in the coupler package. The sensor then measures the rotational position of the coupler package relative to the sensor package by detecting and measuring, with the two part receiving coil, the signal returned by the coupler coil. The signal processor calculates the position of the coupler package relative to the sensor package by comparing the coupling factors between the coupler package and the sensor package.

19 Claims, 3 Drawing Sheets

(56) References Cited

U.S. PATENT DOCUMENTS

| | | | | |
|---|---|---|---|---|
| 2003/0137294 A1* | 7/2003 | Gleixner | ............. | G01D 5/2073 324/207.17 |
| 2006/0144166 A1* | 7/2006 | Ruehl | .................... | G01L 3/105 73/862.331 |
| 2006/0250128 A1* | 11/2006 | Tahara | ................. | G01D 5/2086 324/207.25 |
| 2008/0054887 A1* | 3/2008 | Lee | ..................... | G01D 5/2053 324/207.17 |
| 2008/0174302 A1* | 7/2008 | Lee | ..................... | G01D 5/2046 324/207.16 |
| 2009/0021245 A1* | 1/2009 | Lee | ..................... | G01D 5/2053 324/207.16 |
| 2009/0079422 A1 | 3/2009 | Lee | | |
| 2009/0256555 A1* | 10/2009 | Elliott | .................... | G01B 7/003 324/207.24 |
| 2010/0001718 A1* | 1/2010 | Howard | ................. | G01B 7/003 324/207.15 |
| 2011/0181302 A1 | 7/2011 | Shao et al. | | |
| 2012/0293166 A1 | 11/2012 | Lee et al. | | |
| 2013/0141083 A1 | 6/2013 | Lee | | |
| 2014/0167896 A1* | 6/2014 | Tung | .................. | H01F 17/0013 336/5 |
| 2014/0218147 A1* | 8/2014 | Chatani | ............... | H01F 17/0013 336/20 |

FOREIGN PATENT DOCUMENTS

| | | |
|---|---|---|
| EP | 1312889 A2 | 5/2003 |
| WO | 2009074864 A2 | 6/2009 |
| WO | 2011089519 A1 | 7/2011 |

OTHER PUBLICATIONS

Chinese notice of reexamination; Chinese Patent Application No. 2014800250575.

* cited by examiner

MICRO INDUCTIVE SENSOR

CROSS-REFERENCE TO RELATED APPLICATIONS

This application claims priority of U.S. Provisional Application 61/819,118 filed May 3, 2013, the contents of which are included herein by reference.

FIELD OF THE INVENTION

This invention relates generally to position sensors. More particularly, this invention relates to inductive position sensors.

BACKGROUND OF THE INVENTION

Position sensors are often used in various mechanical control systems. Common position sensors include capacitive sensors, potentiometer sensors, and magnetic position sensors. However, inductive sensors are one of the most commonly used position sensors in vehicles. Inductive sensors detect the position of a target by measuring the mutual inductance between the target and the sensing coil. Compared to other magnetic position sensors, inductive sensors are more cost effective because they do not need a magnet and instead use an electromagnetic coil.

Inductive sensors are also desirable to use in vehicles instead of magnetic type sensors because inductive sensors are generally more reliable. Magnetic sensors can suffer performance loss as the magnet degrades and are more sensitive to magnetic disturbances from the surrounding environment. In contrast, inductive sensors are not dependent upon magnets and are more tolerant of interference from common automotive devices such as electric motors and alternators. However, to ensure adequate signal strength, inductive sensors are generally larger than traditional magnetic sensors. Consequently, inductive sensors also produce greater amounts of magnetic emissions due to their larger antenna area.

SUMMARY OF THE INVENTION

Embodiments of the present invention include a sensor package and a coupler package. The sensor package includes a plurality of pins, a signal processor, an integrated capacitor, a ferrite layer, a transmitter coil, a two part receiving coil, and a plurality of discrete components. The coupler package includes an integrated capacitor, a ferrite layer, and a coupler coil.

The transmitter coil in the sensor package is energized by an external power source which in turn energizes the coupler coil in the coupler package. The sensor then measures the rotational position of the coupler package relative to the sensor package by detecting and measuring with the two part receiving coil the signal returned by the coupler coil. The signal processor calculates the position of the coupler package relative to the sensor package by comparing the coupling factors between the coupler package and the sensor package.

In sharp contrast to conventional inductive sensors which use a metal piece as the fabricated coupler, the present invention uses a resonator as the coupler. Using a resonator as the coupler allows the transmitter coil and the coupler to become an oscillator system with a much higher quality factor (Q factor) than a conventional inductive sensor. Furthermore, the ferrite layer of the sensor package and the coupler package allows the size of the coils to be significantly reduced relative to conventional inductive sensors.

The eddy current on the coupler is the direct source of the signal on the two part receiving coil. When subjected to the same magnetic field as a conventional coupler, the resonator coupler will generate more eddy current. Therefore, using the same driving power, an inductive sensor using a resonator as the coupler can generate a much stronger electromagnetic field on the receiving coil than a conventional inductive sensor.

DETAILED DESCRIPTION OF THE INVENTION

Figure 1:
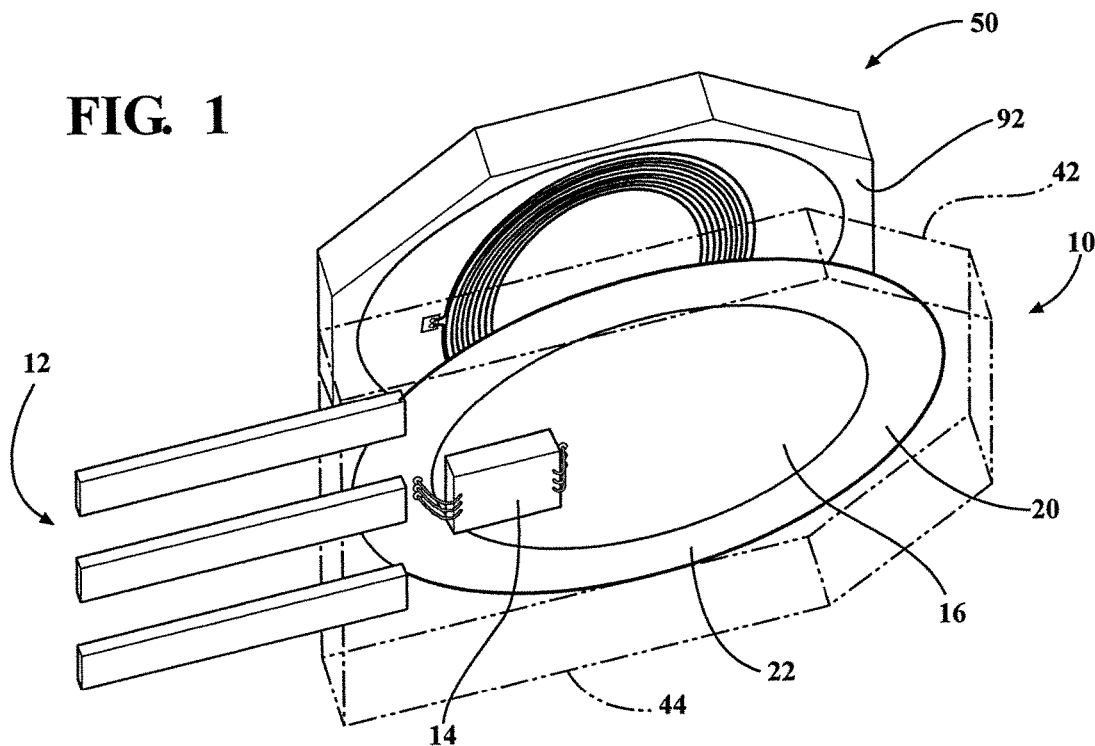
FIG. 1 illustrates a perspective view of the inductive sensor including the sensor package and the coupler package.
Figure 2:
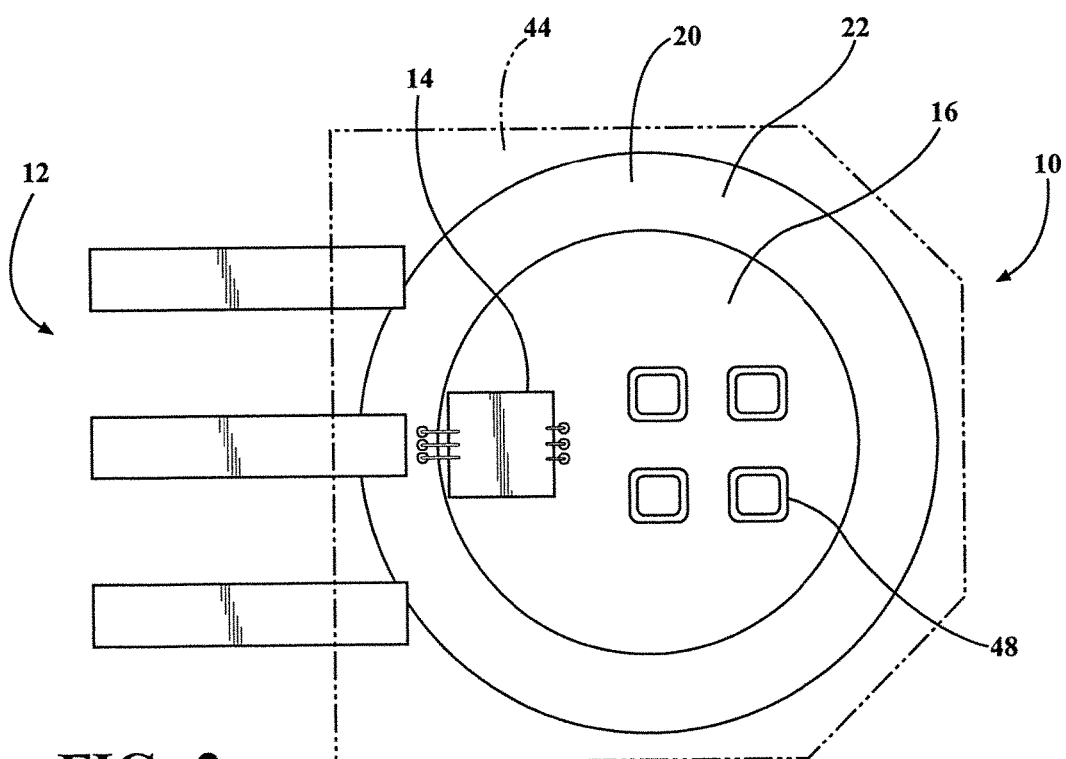
FIG. 2 illustrates a bottom side view of the sensor package.

Embodiments of the present invention include a sensor package 10 and a coupler package 50. The sensor package 10 includes a plurality of pins 12, a signal processor 14, an integrated capacitor 16, a ferrite layer 20, a transmitter coil 22, a two part receiving coil 30, and a plurality of discrete components 48. The coupler package 50 includes an integrated capacitor 56, a ferrite layer 60, and a coupler coil 70. The transmitter coil 22 in the sensor package 10 is energized by an external power source (not shown) which in turn energizes the coupler coil 70 in the coupler package 50. The sensor 10 then measures the rotational position of the coupler package 50 relative to the sensor package 10 by detecting and measuring with the two part receiving coil 30 the signal returned by the coupler coil 70. The signal processor 14 calculates the position of the coupler package 50 relative to the sensor package 10 by comparing the coupling factors between the coupler package 50 and the sensor package 10.

The sensor assembly of the present invention including the sensor package 10 and the coupler package 50 are generally shown in FIG. 1. The inductive sensor and sensor package 10 of the present invention features a miniaturized design that can be fit into a single package due to enhanced signal strength. The sensor package 10 has a top side 42, which faces a bottom side 92 of the coupler package 50, and an opposite bottom side 44. A ferrite layer 20 extends substantially throughout the sensor package 10 and has a generally circular shape, although other shapes according to the sensor package 10 and coils 22, 30 are also possible.

On the bottom side 22 of the ferrite layer 20 there is an integrated capacitor 16 having a plurality of discrete components 48. These discrete components 48 can include capacitors, resistors, or other basic electronic components known in the art. A signal processor 14 is also found on the bottom 22 of the ferrite layer 20. The signal processor 14 measures and processes the signals produced and received by the sensor package 10. The signal processor 14 is also connected to the pins 12 which transmit the various signals of the sensor package 10.

Figure 3:
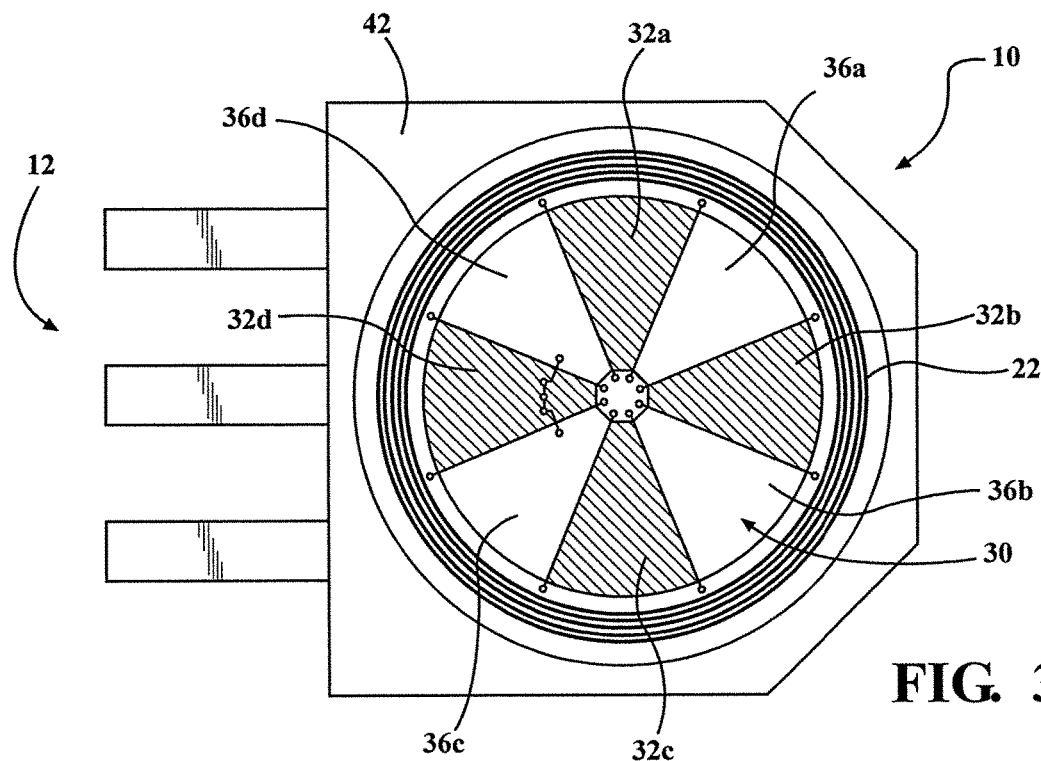
FIG. 3 illustrates a top side view of the sensor package and the two part transmitter coil according to a first embodiment.
Figure 4:
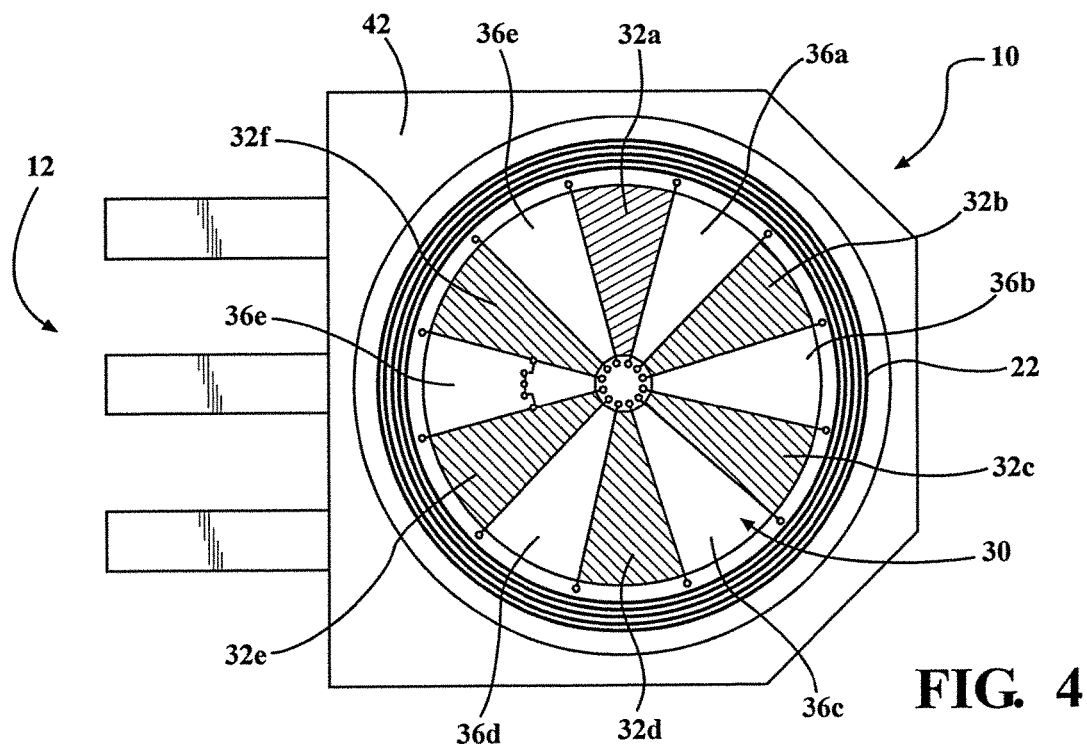
FIG. 4 illustrates a top side view of the sensor package and the two part transmitter coil according to a second embodiment.

The transmitter coil 22 and the two part receiving coil 30 are on the top side 42 of the sensor package 10. The transmitter coils 22 shown in FIGS. 3 and 4 are generally circular and concentric with the ferrite layer 20 about an axis of the transmitter coil 22. The transmitter coil 22 has a plurality of windings which may be adjusted as necessary according to design parameters. The transmitter coil 22 is shown having a circular shape, although other embodiments are possible without departing from the scope of the invention.

The two part receiving coil 30 is shown in FIGS. 3 and 4 residing inside an inner diameter of the transmitter coil 22 on the top side of the sensor package 10. The two part receiving coil 30 of the sensor package 10 has a first receiver coil 32 and a second receiver coil 36. The first receiver coil 32 has N loops wound in a first direction. In a first preferred embodiment shown in FIG. 3, the first receiver coil loops 32*a-d* are arranged about the central axis of the transmitter coil 22 and within the inner diameter of the transmitter coil 22. The first receiver coil loops 32*a-d* are spaced about the transmitter coil 22 axis by 360/N degrees. For example, as shown in FIG. 3 there are N=4 first receiver coil loops 32*a-d* and therefore each loop 32*a-d* of first receiver coil 32 is spaced apart from the adjacent first receiver coil 32 loop 32*a-d* by 90 degrees.

The second receiver coil 36 also has N loops 36*a-d* which are wound in a direction opposite to the first receiver coil 32. Each of the second receiver coil loops 36*a-d* are angularly spaced by 360/N degrees about the transmitter coil 22 axis relative to the adjacent second receiver coil loop 36*a-d*. The second receiver coil loops 36*a-d* are also angularly offset from adjacent first receiver coil loops 32*a-d* by 180/N degrees and vice versa.

More simply, as shown in FIG. 3, the circular area inside the transmitter coil 22 is divided angularly into 2N sections. Proceeding angularly about the transmitter coil 22 axis, the two part receiving coil 30 sections alternate between loops 32*a-d* of the first receiver coil 32 and loops 36*a-d* of the second receiver coil 36. The loops 32*a-d* of the first receiver coil 32 are wound in a first direction while the loops 36*a-d* of the second receiver coil 36 are wound in an opposite second direction. In this way, loops 32*a-d* of the first receiver coil 32 are only adjacent to loops 36*a-d* of the second receiver coil 36 and loops of the first 32 and second receiver coils 36 are angularly offset from one another by 180/N degrees.

In a second preferred embodiment shown in FIG. 4, 3 there are N=6 first receiver coil loops 32*a-f* and therefore each loop 32*a-f* of first receiver coil 32 is spaced apart from the adjacent first receiver coil 32 loop 32*a-f* by 60 degrees. One skilled in the art will appreciate that the number of N loops of the first receiver coil 32 and second receiver coil 36 can be similarly adjusted to include different numbers of N sections.

Figure 6:
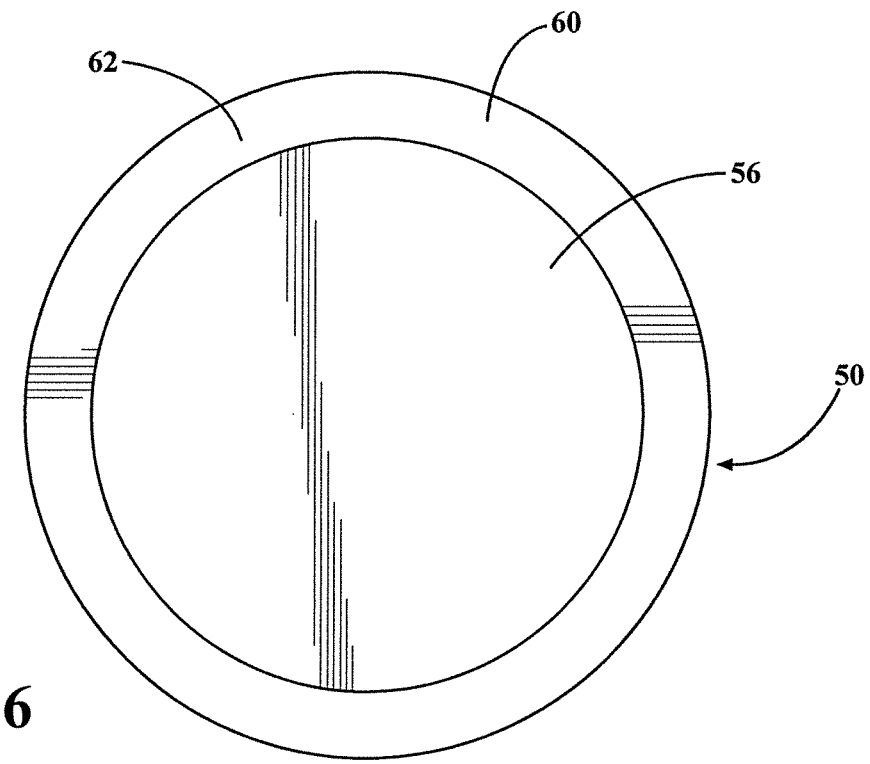
FIG. 6 illustrates a top side view of the coupler package.

The coupler package 50 has a ferrite layer 60 having a top side 62 and a bottom side 66. The ferrite layer 60 has an integrated capacitor 56 on the top side 62 and a noncircular coupler coil 70 on the bottom side 66. The bottom side 66 of the ferrite layer 60 of the coupler package 50 faces the top side 42 of the sensor package 10. The integrated capacitor 56 of the coupler package 50 shown in FIG. 6 is circular; however, this shape is exemplary and other arrangements are possible. The noncircular coupler coil 70 is made from a plurality of windings and dimensioned so that when aligned about the axis of the transmitter coil 22 of the sensor package 10, the coupler coil 70 overlies at least a portion of both the first 32 and second receiver coil 36 loops 32*a-d*, 36*a-d*.

Figure 5:
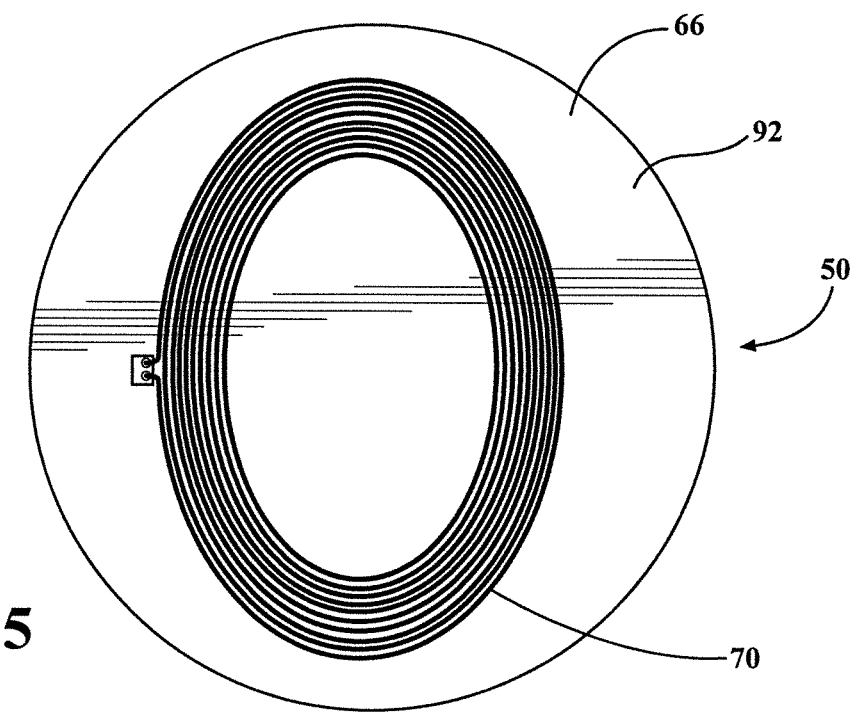
FIG. 5 illustrates a bottom side view of the coupler package.

The coupler coil 70 shown in FIG. 5 has a generally oval shape; however, the coupler coil 70 is not limited to this shape alone. When the coupler coil 70 of the coupler package 50 is aligned about the axis of the transmitter coil 22 and the sensor package 10, the coupler coil 70 will overlie at least a portion of both the first and second receiver coil loops 32*a-d*, 36*a-d*.

As the coupler package 50 rotates about the axis of the transmitter coil 22, the portion of the coupler coil 70 overlapping the first and second receiver coil loops 32*a-d*, 36*a-d* changes. This in turn changes the amount of coupling factor between the coupler package 50 and each of the first receiver coil 32 and second receiver coil 36. Using the signals measured by the two part receiving coil 30, the processor 14 generates an output signal representative of the rotational position of the coupler package 50 relative to the sensor package 10.

Using ferrite layers 20, 60 in both the sensor 10 and coupler packages 50 focuses the electromagnetic fields and keeps the energy in local space. The electromagnetic energy is therefore used more efficiently by the sensor 10 to generate the signal. Furthermore, the combination of the ferrite layers 20, 60 and the integrated capacitors 16, 56 provide electromagnetic shielding to the sensor 10 and coupler packages 50 which reduces the negative effects of electromagnetic interference from other components. In this way, the overall size of the sensor package 10 and the coupler package 50 can be minimized.

In another preferred embodiment, printed circuit boards (PCBs) are used in the fabrication of the sensor package 10 and coupler package 50. The transmitter coil 22 and two part receiving coil are fabricated on a first PCB as is known to those skilled in the art. Similarly, the coupler coil 70 is fabricated on a second PCB. A first ferrite disc 20 is arranged on a bottom side of the first PCB and a second ferrite disc is arranged on a top side of the second PCB. The ferrite discs, PCBs, and additional components are then disposed within a housing. In this way, PCBs and ferrite discs are used to form the sensor package 10 and the coupler package 50.

From the preceding, it can be seen that the present invention provides a micro inductive rotary position sensor able to generate an output signal representative of the rotational position of the coupler package relative to the sensor package. Furthermore, both the sensor package and coupler package can be individually over molded in a plastic package. The coils may be fabricated by micro fabrication technology which includes, but is not limited to, sputtering, chemical vapor deposition, and electrodeposition. Using micro fabrication technology allows more coil turns to be built on a small area. The transmitter coil of the sensor package is shown concentrically wound around the first and second receiver loops; however, the present invention is not limited to this exemplary arrangement.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art.

We claim:

1. An inductive sensor assembly comprising:
   a signal processor;

a sensor package having a top side of the sensor package facing a coupler package and a bottom side of the sensor package opposite the top side;

a ferrite layer disposed between the top side and the bottom side of the sensor package, the ferrite layer having a top surface and an opposite bottom surface, the signal processor is disposed to the bottom surface of the ferrite layer;

a transmitter coil and a two part receiving coil, the transmitting coil having an inner diameter, the two part receiving coil having a first receiving coil and a second receiving coil, the signal processor is disposed within the inner diameter of the transmitting coil; and the coupler package having a coupler coil, the coupler coil having a plurality of windings;

wherein the first receiving coil has a plurality of first receiving loops wound in a first direction and the second receiving coil has a plurality of second receiving loops wound in a second direction opposite the first direction;

the plurality of first receiving loops are arranged about a central axis of the transmitter coil, each of the plurality of receiving loops having a diameter less than the inner diameter of the transmitting coil.

2. The inductive sensor assembly of claim 1, further comprising: an integrated capacitor disposed on the bottom surface of the ferrite layer of the sensor package.

3. The inductive sensor assembly of claim 1, wherein the transmitter coil is generally circular with a plurality of transmitter windings and the two part receiving coil is concentric within an inner diameter of the transmitter coil about a central axis of the transmitter coil on a top side of the sensor package facing the coupler package.

4. The inductive sensor assembly of claim 1, wherein the two part receiving coil has an equal number of first receiving loops and second receiving loops.

5. The inductive sensor assembly of claim 1, wherein the first receiving loops are spaced about a transmitter coil axis by 360/N degrees and N is an integer value.

6. The inductive sensor assembly of claim 5, wherein the second receiving loops are angularly offset from an adjacent first receiving loop about the transmitter coil axis by 180/N degrees, the second receiving loops spaced about the transmitter coil axis by 360/N degrees.

7. The inductive sensor assembly of claim 6, wherein each first receiving loop is angularly adjacent to two second receiving loops and each second receiving loop is angularly adjacent to two first receiving loops.

8. The inductive sensor assembly of claim 1, further comprising:
a bottom side of the coupler package facing the sensor package;
a top side of the coupler package opposite the bottom side; and
a ferrite layer having a top surface and a bottom surface and disposed between the top side and the bottom side of the coupler package.

9. The inductive sensor assembly of claim 8, further comprising:
an integrated capacitor disposed on the top surface of the ferrite layer of the coupler package.

10. The inductive sensor assembly of claim 1, wherein the coupler coil is generally elliptical, the coupler coil is aligned about a central axis of the transmitter coil on a bottom side of the coupler package facing the sensor package, and the coupler coil overlies at least a portion of both the first receiving loops and the second receiving loops.

11. The inductive sensor assembly of claim 1, wherein the transmitter coil and two part receiving coil are on a top side of a first printed circuit board and a first ferrite disc is on a bottom side of the first printed circuit board, the coupler coil is on a bottom side of a second printed circuit board and a second ferrite disc is on a top side of the second printed circuit board, and the top side of the first printed circuit board faces the bottom side of the second circuit board.

12. An inductive sensor assembly comprising:
a signal processor;
a sensor package having a top side of the sensor package facing a coupler package and a bottom side of the sensor package opposite the top side, the sensor package having a transmitter coil having an inner diameter, and
a two part receiving coil on a top side of the sensor package and a first ferrite disc on an opposite bottom side of the sensor package, the first ferrite disc having a top surface and an opposite bottom surface, the signal processor is disposed within the inner diameter of the transmitting coil and on the bottom surface of the first ferrite disc; and
the coupler package having a coupler coil on a bottom side of the coupler package, the coupler coil having a plurality of windings, the bottom side of the coupler package facing the top side of the sensor package;
wherein a first receiving coil of the two part receiving coil has a plurality of first receiving loops wound in a first direction and a second receiving coil of the two part receiving coil has a plurality of second receiving loops wound in a second direction opposite the first direction;
the plurality of first receiving loops are arranged about a central axis of the transmitter coil, each of the plurality of receiving loops having a diameter less than the inner diameter of the transmitting coil.

13. The inductive sensor assembly of claim 12, wherein the transmitter coil and two part receiving coil are on a top side of a first printed circuit board and the first ferrite disc is on a bottom side of the first printed circuit board,
the coupler coil is on a bottom side of a second printed circuit board and the second ferrite disc is on a top side of the second printed circuit board, and
the top side of the first printed circuit board faces the bottom side of the second circuit board.

14. The inductive sensor assembly of claim 12, further comprising:
a first integrated capacitor disposed on the bottom surface of the first ferrite disc of the sensor package;
a second ferrite disc on a top side of the coupler package; and
a second integrated capacitor disposed on a top side of the second ferrite disc of the coupler package.

15. The inductive sensor assembly of claim 12, wherein the transmitter coil is generally circular with a plurality of transmitter windings and the two part receiving coil is concentric within an inner diameter of the transmitter coil about a central axis of the transmitter coil on the top side of the sensor package.

16. The inductive sensor assembly of claim 12, wherein the two part receiving coil has an equal number of first receiving loops and second receiving loops.

17. The inductive sensor assembly of claim 12, wherein the first receiving loops are spaced about a transmitter coil axis by 360/N degrees and N is an integer value.

18. The inductive sensor assembly of claim 17, wherein the second receiving loops are angularly offset from an adjacent first receiving loop about the transmitter coil axis by 180/N degrees, the second receiving loops spaced about the transmitter coil axis by 360/N degrees.

19. The inductive sensor assembly of claim 18, wherein each first receiving loop is angularly adjacent to two second receiving loops and each second receiving loop is angularly adjacent to two first receiving loops.

\* \* \* \* \*